United States Patent
Frei et al.

(10) Patent No.: US 12,324,713 B2
(45) Date of Patent: Jun. 10, 2025

(54) MANUFACTURING DEVICE FOR THE MANUFACTURE OF A BLANK FOR A DENTAL RESTORATION PART, METHOD FOR MANUFACTURING A BLANK FOR A DENTAL RESTORATION PART, AS WELL AS BLANK

(71) Applicant: Ivoclar Vivadent AG, Schaan (LI)

(72) Inventors: Roger Frei, Heerbrugg (CH); Markus Kiem, Kastelbell/Tschars (IT); Markus Geier, Tisens (IT)

(73) Assignee: Ivoclar Vivadent AG, Schaan (LI)

( * ) Notice: Subject to any disclaimer, the term of this patent is extended or adjusted under 35 U.S.C. 154(b) by 170 days.

(21) Appl. No.: 18/059,735

(22) Filed: Nov. 29, 2022

(65) Prior Publication Data
US 2023/0165667 A1   Jun. 1, 2023

(30) Foreign Application Priority Data

Nov. 30, 2021 (EP) .................................... 21211407

(51) Int. Cl.
*A61C 13/00* (2006.01)
(52) U.S. Cl.
CPC ...... *A61C 13/0004* (2013.01); *A61C 13/0022* (2013.01)
(58) Field of Classification Search
None
See application file for complete search history.

(56) References Cited

U.S. PATENT DOCUMENTS

| 8,232,506 | B2 | 7/2012 | Jussel |
| 10,315,353 | B1 * | 6/2019 | Culp ..................... B29C 51/421 |
| 10,646,311 | B2 | 5/2020 | Watzke et al. |
| 10,842,599 | B2 | 11/2020 | Volkl et al. |
| 2010/0285429 | A1 | 11/2010 | Karim |
| 2010/0297580 | A1 * | 11/2010 | Niewiadomski ..... B23Q 15/007 433/167 |
| 2016/0184062 | A1 * | 6/2016 | Jussel ....................... A61C 5/77 264/16 |
| 2016/0338805 | A1 * | 11/2016 | Jussel ..................... F27D 19/00 |
| 2017/0189146 | A1 * | 7/2017 | Volkl ....................... A61C 5/77 |
| 2018/0071063 | A1 * | 3/2018 | Watzke .................. A61C 13/00 |

(Continued)

FOREIGN PATENT DOCUMENTS

| DE | 652821 C | 11/1937 |
| DE | 202006006286 U1 | 8/2007 |
| JP | 2017109036 A | 6/2017 |

*Primary Examiner* — Larry W Thrower
*Assistant Examiner* — Jonathan B Woo
(74) *Attorney, Agent, or Firm* — Ann M. Knab; Thad McMurray

(57) ABSTRACT

A manufacturing device is provided for the production of a blank, in particular one which is to be polymerized, of a dental restoration part. A mold for receiving blank material includes in particular a pot-shaped or cup-shaped base and a punch or—possibly hood-shaped—cover. An insert body with a structure on its underside and a heating device for the mold and a control device for the manufacturing device are provided. A height measuring device is connected to the control device, which measures the height of a reference surface connected to the punch or cover, relative to the base. The control device calculates the height position of the structure based on this measured height.

13 Claims, 3 Drawing Sheets

(56) References Cited

U.S. PATENT DOCUMENTS

| | | | |
|---|---|---|---|
| 2020/0015944 A1* | 1/2020 | Geier | A61C 13/0022 |
| 2020/0015947 A1* | 1/2020 | Geier | A61C 13/087 |
| 2021/0128283 A1* | 5/2021 | Kato | A61C 13/26 |
| 2021/0213580 A1* | 7/2021 | Lidan | A61C 13/0022 |
| 2022/0061966 A1 | 3/2022 | Häfele et al. | |
| 2022/0079721 A1 | 3/2022 | Geier et al. | |

* cited by examiner

MANUFACTURING DEVICE FOR THE MANUFACTURE OF A BLANK FOR A DENTAL RESTORATION PART, METHOD FOR MANUFACTURING A BLANK FOR A DENTAL RESTORATION PART, AS WELL AS BLANK

CROSS-REFERENCE TO RELATED APPLICATIONS

This application claims priority to European Patent Application No. 21211407.8 filed on Nov. 30, 2021, the disclosure of which is incorporated herein by reference in its entirety.

TECHNICAL FIELD

The present invention relates to a manufacturing device for manufacturing a blank for a dental restoration part, a method for manufacturing a blank for a dental restoration part, and a blank for a dental restoration part.

BACKGROUND

Manufacturing devices for dental restoration parts such as prostheses have been known for a long time. Already from DE 652 821 B1 an injection mold can be seen, into which masses for polymerization are filled.

A multi-colored blank is known from DE 20 2006 006 286 U1. Such a blank is intended to be milled into, for example, a dental prosthesis in a dental milling device.

EP 3 064 170 A1 and U.S. Ser. No. 10/646,311B2, which US patent is hereby incorporated by reference in its entirety, shows a significant improvement for the production of a dental prosthesis blank, namely a special two-colored blank. The blank is in disc form and has, on the one hand, preformed dental material and, on the other hand, preformed prosthesis base material. Full prostheses as well as partial prostheses can be completely milled from such a blank. US 20220061966, US 20220079721, US 20160338805, US 20210128283, and US 20200015944, which US published applications are hereby incorporated by reference in their entirety, are directed to dental devices and/or dental blanks.

For the production of such a blank, a manufacturing device has been proposed which works with an insert body. According to this proposal, the tooth material is first injection molded and partially polymerized with the aid of the insert body. The insert body is then removed and the base material is injection molded between the exposed surface of the tooth material and a cover. The surface of the tooth material is used effectively as part of the mold for the base material and forms the boundary surface between these materials. The subsequent final polymerization results in a particularly good bond between the base material and the tooth material.

However, in the internal tests carried out, the height position of the boundary surface between the tooth material and the base material was quite different. Apparently, the polymerization shrinkage varies from batch to batch, and during injection molding it also depends on the filling dosage.

To get close to the required tolerances, working with oversized metal molds and with a calculated material surplus has also been suggested. Although this is possible and represents a certain improvement, it is ill-suited for large-scale production. In addition, raw material fluctuations, weighing and process tolerances make the process more difficult.

SUMMARY

Therefore, the invention is based on the task of creating a manufacturing device for the manufacture of a blank for a dental restoration part, a method for manufacturing a blank for a dental restoration part, as well as a blank for a dental restoration part, which are more suitable for large-scale production, but still allow improved accuracy.

This task is solved according to the invention by the independent claims. Advantageous further embodiments result from the subclaims.

According to the invention, a manufacturing device for manufacturing a blank, in particular to be polymerized, for a dental restoration part is equipped with a mold for receiving blank material. The mold has an in particular pot-shaped or cup-shaped base and a punch or—optionally hood-shaped—cover. Preferably, a conveyor path is provided as a support on which the mold can be placed or stands. This can be a conveyor belt or a solid, preferably smooth, surface on which the mold can be moved.

An insert body with a structure on its underside which can be inserted into the mold is preferably provided. If necessary, this can be integral with the punch or cover. It preferably occupies the upper part of the base of the mold so that a space remains underneath which can be filled with material, in particular injection molding tooth material.

A heating device is provided for the mold, which in particular is connected to the cover in a manner that conducts heat or is arranged in the latter, and a control device is provided for the manufacturing device.

Alternatively, heating can also be provided from below and/or from both sides. The polymerization can also be started or controlled by another method (light). In this case, a transparent mold is preferred.

The mold is subjected to high pressure, which can be e.g. 80 bar. Subsequent to the polymerization, significant cooling can take place. Furthermore, it is also possible to use self-polymerizing plastics.

According to the invention, in addition, a height measuring device is connected to the control device, which measures the height of a reference surface connected to the punch or cover, relative to the base or relative to the support.

The control device calculates the height position of the structure in the blank based on this measured height.

For the calculation it is assumed that all fixed, e.g. metallic, parts of the manufacturing device have known and constant dimensions. This includes the base. If the base is pot or cup shaped, it has a base bottom and base walls. The base stands on the solid support. The cover—or punch—has a known height, as does the insert body. If these two are made as one piece, they have a known overall height. The reference surface is attached to or on the cover and is preferably formed by its upper surface.

According to the invention, it is preferred that the first material initially provided, preferably the tooth material, —as a first part—is injection molded into the mold using a first cover provided with the structure, and then the first cover is removed and the second, flat cover is inserted and the second material—as a second part —, for example the base material, is injection molded.

However, the invention is not limited to this sequence. Alternatively, the mold can be used to produce the first part only, with a subsequent height measurement of this part. The second part is then applied to the first part in a different mold.

Alternatively, the second part can be glued on after the height measurement of the first part.

Instead of injection molding, the first part can also be produced subtractively, e.g. by milling. The height measurement can then be carried out after inserting the first part into the mold. For this purpose, the first part preferably has a flat reference surface, the height of which is measured by the height measuring device. The measurement result is sent to the control device.

Furthermore, the second part—independently of the first part—can also be produced in any desired manner. After the height measurement of the first part, the second part can be applied. It can also be additively produced, e.g. by 3D printing, and then glued or polymerized on.

The height measuring device simply measures the height of this reference surface above the support on which the base of the mold stands. This means that the total height of the mold is known. This is not of interest in itself, but it does allow the height position of the structure in the—later—blank to be calculated, using the following formula:

$$H_s = H_g - H_d - H_e - H_b$$

where:
$H_s$: height position of the structure in the—later—blank:
$H_g$: measured total height of mold
$H_d$: known height of cover
$H_e$: known height of insert body
$H_b$: known height of base bottom The height position of the structure corresponds to the position of the material transition in the disc-shaped blank. Above the material transition, base material in a color A is provided; below the material transition, tooth material in a color B is provided. The accuracy of the material transition from color A to color B represents an essential basis for the aesthetic fabrication of prostheses, hybrid prostheses or partial prostheses, in particular of prosthesis bases, from the multi-colored disc blanks.

Preferably, the control device outputs information as to whether the measured height is within a tolerance range or not. According to experience, the dental tolerance range is +−500 μm.

With the solution according to the invention, this tolerance range can be significantly undercut if necessary, even if, for example, there are raw material fluctuations, weighing and process tolerances that lead to material transition shifts in the mentioned range. By measuring the exact material height within the mold during the manufacturing process, in particular after polymerization of the first material layer, the exact or approximately exact position of the material transition can be transmitted for each individual blank during subsequent production using CAD/CAM technology and precisely achieved during milling.

In the entire system consisting of the blank disc, the milling holder and the milling machine, a very large tolerance factor can be greatly reduced, which has an influence on the optical result.

For this purpose, the measured values of each blank are manually transferred to the CAM or stored on an RFID transponder and can be directly identified by the CAM software when the blank is read in. The software then transfers the compensation values to the CNC milling program. This ensures that the material transition is achieved true to position and that a consistently high level of aesthetics is generated for the prosthesis base.

Multi-colored milling blanks, especially for the fabrication of monolithic prosthesis bases, feature a parallel horizontal material transition from tooth material to the base material, which is also called gingival material. In the proposed solutions before the present invention, this inevitably led to an insufficient aesthetic design, especially of the gingival margin or in the dorsal area of the prosthesis bases. Intensive reworking, e.g. by applying characterization materials, was necessary and had to be accepted.

According to the invention, these problems have been overcome. With the invention, a very satisfactory aesthetic design is possible, especially of the gingival margin or in the dorsal area of the prosthesis bases.

In addition, an internal geometry according to the invention with a predefined gingival margin, e.g. in the form of a wavy line (similar to the course of a natural gingival margin), reduces reworking and improves the result.

The manufacturing process according to the invention for e.g. multi-colored milling blanks allows an exact determination of the material height, in particular the transition line from color A to color B, which is formed by the boundary surface. This technical advantage enables the transfer of measurement data to the milling software or other CAM software. The resulting possibility of ensuring the approximately exact positioning of the transition is a significant advance.

Via a measuring system, information on the position/alignment of the inner geometry or the color transition between the materials is determined, which can be used for the subsequent CAD/CAM process.

For the transmission and reproduction of the exact position/alignment of the non-visible inner geometry of the disc, namely the boundary surface between the materials, a height position of the boundary surface is calculated e.g. according to the above formula.

Based on this, a compensation value is determined, e.g. as a—positive or negative—difference between a nominal height position and the calculated height position of the boundary surface. This compensation value is transferred to a CAD/CAM system. This results in an increase and guarantee of maximum and reproducible aesthetics. Complicated reworking or repairs to the prosthesis bases are no longer necessary.

In an advantageous embodiment, it is provided that the compensation factor can be read/retrieved on the blank by means of an imprint, insert or RFID transponder. It can also be stored in encrypted form in a central cloud.

In an advantageous embodiment, it is provided that the mold according to the invention is placed on a support, which thus defines the underside of the mold. A height measuring device is able to measure the distance between the top of the mold and the base, namely the underside of the base.

The upper part of the mold is formed by a punch or cover, which covers the top of the base and thus provides a mold space for injection molding. This cover has a top surface. This serves as a reference surface. The height measuring device measures the distance between the top of the cover and the base and thus between the reference surface and the support.

In the preferred embodiment, the height measuring device has at least one touch probe. This measures the height position of the reference surface. In a further improved embodiment, the height measuring device comprises at least three touch probes or sensors. This enables it to determine the height of the boundary surface even in three-dimensional space.

In further advantageous embodiments, instead of this, the height measuring device comprises an optical sensor, a laser range finder, an ultrasonic sensor, an infrared range finder or an optical sensor. The optical sensor may also comprise a reference optical system which cooperates with at least one reference point, the position of which it detects and thereby detects a displacement of the reference surface, in particular on the cover, relative to the base or the support and transmits this to the control device.

Instead of this, the height measuring device can also have a capacitive or a strain gauge sensor. These respond to and detect even slight relative movements between the cover and the base.

With such probes, one element of the probe is preferably attached to the cover, e.g. its skirt, and the other element is attached to the base adjacent to the latter.

It is preferred that the height measuring device has an accuracy of less than 2 mm, in particular less than 0.3 mm and preferably about 0.1 mm. The preferred height measuring device operates with an accuracy of 0.01 mm. The set tolerance is 0.5 mm. Therefore, if the measured layer is e.g. 0.6 mm higher than the defined tolerance, e.g. higher than 0.6 mm, then the product is declared to be poor.

The actual height position is calculated, for example, according to the above formula based on the measurement data obtained and consequently the height position of the structure is determined. The structure can be of different shapes and is preferably wave-shaped. Three reference points of the structure are established, and the control device outputs data on the height position of the structure based on the three reference points.

According to the invention, the height position of the structure of the respective blank, which is available in data form, is assigned to it in a suitable manner so that the data on the height position is available at all times. For example, an output device can be provided for this purpose, which is connected to the control device and stores the data in a database in association with the relevant blanks.

Instead of this, the output device can also be a printer for generating labels. These labels are then attached to the blank in printed form. Instead of this, the output device can also be an RFID chip programming device. After programming, the generated and programmed RFID chip is then attached to the blank. The height position data is thus either electronically assigned, e.g. via a database, or brought in close proximity to the blank via an information carrier.

The information carrier can be any medium via which the data can be assigned to the blank. For example, the data can also be lasered onto the blank, they can be engraved, they can be stamped or they can be printed, either in plain or encoded text.

In an advantageous embodiment, a heating device is provided for the mold, which is in heat-conducting connection with the cover. In an advantageous embodiment, two covers/punches are provided, one with and one without an insert body/structure. First, the first cover, which has the structure or an insert body with structure on its underside, is placed on the base. The first material, preferably dental material, is injected. Polymerization or at least partial polymerization of this material takes place. The first cover is removed. The material has a counter-structure on its upper side which corresponds exactly to the imprint of the structure.

The second cover is flat on its underside and has a lower height than the first cover. There is a free space between its underside and the counter-structure. The second material, preferably base material, is now injected into this space. In doing so, the counter structure forms a part of the mold space. Polymerization is carried out again in such a way that both materials are now fully polymerized. After cooling, the mold is removed and a milling blank as a semi-finished product is finished.

It is also possible that the first part of the blank—made of the first material—is transferred to another mold where it is provided with the second part and the blank disc is finished there. This allows a time and possibly energy-saving process to be realized.

In an advantageous embodiment, an output device is connected to the control device. This outputs the height position of the structure in relation to a base, in particular a conveyor path on which the mold can be placed or is placed.

Alternatively, the total height of the base and punch or cover is output.

In a further embodiment, the output is made to a database for assigning the data to a respective molded blank for the dental restoration part, or to a printer for generating labels with which labels can be printed for attachment to the blank, or to an RFID chip programming device.

Alternatively, it is provided that the control device stores the data in a memory, in particular a database, this memory being accessible, in particular accessible online, by a milling machine for milling the dental restoration part.

The control device performs a calculation to determine the height position of the structure in the blank. For this purpose, it stores the known distance between the bottom of the insert body and the top of the cover. From this it subtracts the height measured by the height measuring device and the distance between the lower inside of the mold and the underside of the mold. In this way it determines the height position of the structure, and/or the total height of the base with punch or cover.

In a further advantageous embodiment, the manufacturing device according to the invention and the blank material form a system for manufacturing a semi-finished product as a milling blank. This is advantageously disc-shaped. Dental prostheses or partial prostheses can be produced from the milling blank in a dental milling device. It is advantageous if dental material and base material are used as the blank materials and the structure corresponds to a boundary surface between dental material and base material in a semi-finished product to be manufactured, and in particular forms a chain line along a gingival margin in the semi-finished product.

Various variations of the method according to the invention—and thus also of the devices required for carrying it out—are possible. The dental material and the base material can be polymerizable plastics such as PMMA, but also ceramics such as zirconium dioxide or lithium metasilicate, used as a semi-finished part, or composites or any other suitable dental materials.

It is also possible to combine different materials of those mentioned above for dental material and base material. The manufacturing process must of course be adapted to the material used, e.g. polymerization (at least partial polymerization) for plastic and sintering or isostatic pressing (hot isostatic or cold isostatic, preferably cold isostatic) for ceramic.

Basically, the following possibilities exist for providing an internally structured blank for the fabrication of a dental prosthesis or partial prosthesis:

Here, the dental material can be the first material, or the base material can be the first material and the other then the second material.

The first material is produced subtractively and the second material is additively applied to it.

The first material is produced subtractively and the second material is produced subtractively and then both materials are glued together.

The first material is produced by pressing, in particular isostatic pressing, and the second material is additively applied to it.

The first material is produced subtractively and the second material is additively pressed onto it by, in particular isostatic, pressing.

The first material is produced by pressing, in particular cold isostatic pressing, and the second material is additively pressed onto it by pressing, in particular cold isostatic pressing. In this embodiment, surprisingly, the use of adhesive can be dispensed with.

In a manner known per se, the shrinkage ("sinter shrinkage") is taken into account during the pressing, in particular isostatic pressing. In this way, the target position of the structure, e.g., the wave structure, can be precisely determined in advance, so that the chain line of the boundary line later corresponds to the gingival margin.

The first material is placed in a mold equipped with the height measuring device according to the invention, the cover of which has the negative image of the structure. The height position of the cover is measured—if necessary three-dimensionally—and assigned to this specimen of the pre-form, e.g. stored in a database for the single pre-form.

In a preferred embodiment, the first material is uniaxially pre-pressed and the second material is uniaxially or isostatically pre-pressed. Both pre-products (="pre-forms") are then subtractively processed, in particular milled, to form the structure on the surfaces that will later face each other, the second material with the negative image of the structure, which is also referred to as the complementary structure. The pre-forms are placed on top of each other and cold-isostatically pressed together, and in the process finally press-compacted and joined together.

The joined pre-forms are then debonded and pre-sintered.

The connected pre-forms are then inserted into the mold equipped with the height measuring device according to the invention, the cover of which is now flat. The height position of the cover is measured—if necessary three-dimensionally—and assigned to this specimen of the connected pre-form, e.g. stored in a database for the pre-form.

The connected pre-form is then ready for sale as a semi-finished product—also called a "blank"—together with the data from the database on the height position of the inner structure.

The user can then mill the desired dental restoration part or parts out of these and sinter them densely. The user preferably already takes the height position of the structure into account during CAD, or at the latest during CAM, i.e. during milling.

It is preferable that a manufacturing device for manufacturing a blank for a dental restoration part is provided having a mold for receiving blank material, said mold having a base and a punch or cover with an underside, and a control device for the manufacturing device, wherein a height measuring device is connected to the control device, which measures the height of a reference surface connected to the punch or cover, relative to the base or a support on which the base stands, and wherein the control device calculates the height position of the underside of the punch or cover based on the measured height.

It is preferable that the reference surface is formed on the top of the punch or cover and the height measuring device measures the distance between an upper side of the punch or cover and the base or the support on which the base is placed.

It is preferable that the height measuring device comprises at least one optical sensor or at least one touch probe, preferably a plurality of touch probes. with which, in addition to the height, the position of the punch or cover can also be measured in three-dimensional space.

It is preferable that a structure is formed on the underside of the cover or an insert body and the height position of the structure calculated by the control device comprises the calculation of at least one reference point of the structure, preferable at least 3 reference points of the structure, and wherein the control device outputs data on the height position of the structure, preferably the control device determines the height position of the structure, and/or the height of the blank and/or the parallelism of its surfaces.

It is preferable that an output device is connected to the control device and outputs the height position in relation to the base, to a database for an assignment of data to a respective molded blank for the dental restoration part, or to a printer for generating labels which can be used to print labels for attachment to the blank, or to an RFID chip programming device, or wherein the control device stores the data in a memory in a database, which memory can be accessed by a milling machine for milling the dental restoration part.

It is preferable that the mold is placed on a conveyor path and the control device outputs the height position based on the mold on the conveyor path. is an output device is connected to the control device and outputs the height position on the base, in particular a conveyor path on which the mold can be placed or is placed, in particular to a database for the assignment of the data to a respective molded blank for the dental restoration part, or to a printer for generating labels which can be used to print labels for attachment to the blank, or to an RFID chip programming device, or in that the control device stores the data in a memory, in particular a database, which memory can be accessed, in particular online accessed, by a milling machine for milling the dental restoration part.

It is preferable that the structure extends three-dimensionally in space and spans a structural plane which has an inclination to the base of up to 30% and less than 15%, and whose height or spatial position relative to a support comprising a conveyor path or belt, on which the mold can be placed or stands, is calculated by the control device using measurement results of the height measuring device.

It is preferable that the tooth material and base material are used as blank materials and the structure corresponds to a boundary surface between tooth material and base material in a semi-finished product to be manufactured, and forms a chain line along a gingival margin in the semi-finished product.

It is preferable that the structure corresponds to the boundary surface between differently colored layers of tooth material and/or of base material in the blank.

It is preferable that, for the calculation, the control device subtracts a known distance between the bottom of the insert body or of a cover and a top of the cover from the height measured by the height measuring device and the distance between the lower inside of the mold and the bottom of the mold in order to determine the height position of the structure in the blank.

It is preferable that the control device takes into account a material-dependent or material-conditional shrinkage factor for the shrinkage between partial polymerization and full polymerization in the output.

It is preferable that the mold omits a circumferential edge which results in a projecting circumferential edge on the blank, the height position of which is taken into account as a calculated reference when milling the blank, the said edge being adjacent to the structure, in terms of height, wherein the base of the mold has or forms a lower reference surface, the height position of which is taken into account as a calculated reference when milling the blank.

It is preferable that the height position data output by the control device also comprises data characterizing the boundary surface between the tooth material and the base material.

It is preferable that the punch or cover comprises an insert body with a structure, and wherein the measurement of the height position relates to the measurement of the underside of the insert body.

It is preferable that a manufacturing device for manufacturing a blank for a dental restoration is provided having a mold for receiving blank material, said mold having a base and a punch or cover with an underside, and a control device for the manufacturing device, wherein a height measuring device is connected to the control device, which measures the height of a material reference surface relative to the base or a support on which the base stands, and wherein the control device outputs information based on this measured height as to whether or not the measured height lies within a tolerance range.

It is preferable that a method for manufacturing a blank for a dental restoration part is provided, having a mold for receiving blank material, wherein the blank material comprises tooth material and/or gingival base material, with said mold having a base and a punch or cover with an underside, and with a control device for the manufacturing device, wherein a height measuring device outputs at least one measured value to the control device which represents the height of a reference surface connected to the punch or cover or of a material reference surface, relative to the base, and wherein the control device calculates the height position of the structure on the basis of this measured height or outputs information as to whether or not the measured height is within a tolerance range.

It is preferable that in the method, several molds are used successively for the production of the blank for the dental restoration part, a first mold having a structure at a first height relative to the base which is different from the height position of the structure of a second mold, and wherein the control device calculates the height position of the structure of the first mold and allows further production in the second mold if the height position is within a predetermined tolerance range.

It is preferable that in the method, several, in particular 2 to 6, molds are used successively for the production of the blank for the dental restoration part, a first mold having a structure at a first height—relative to the base—which is different from the height position of the structure of a second mold, and in that the control device calculates the height position of the structure of the first mold and allows further production in the second mold if the height position is within a predetermined tolerance range.

It is preferable that in the method, a first material comprising the tooth material, is prefabricated by 3D printing, and is introduced into the mold, and the material reference surface is formed on the first material.

It is preferable that a blank with an information carrier is provided, the blank being intended for use in or manufactured by a manufacturing device, wherein the information carrier indicates the height position of the structure or a spatial position of the structure in the blank or the total height of the blank, said structure forming a boundary surface between dental materials for the manufacture of the blank separating tooth-colored material from gingival-colored material.

BRIEF DESCRIPTION OF THE DRAWINGS

Further details, advantages and features will be apparent from the following description of several exemplary embodiments of the invention with reference to the drawings, in which.

DETAILED DESCRIPTION

Figure 1:
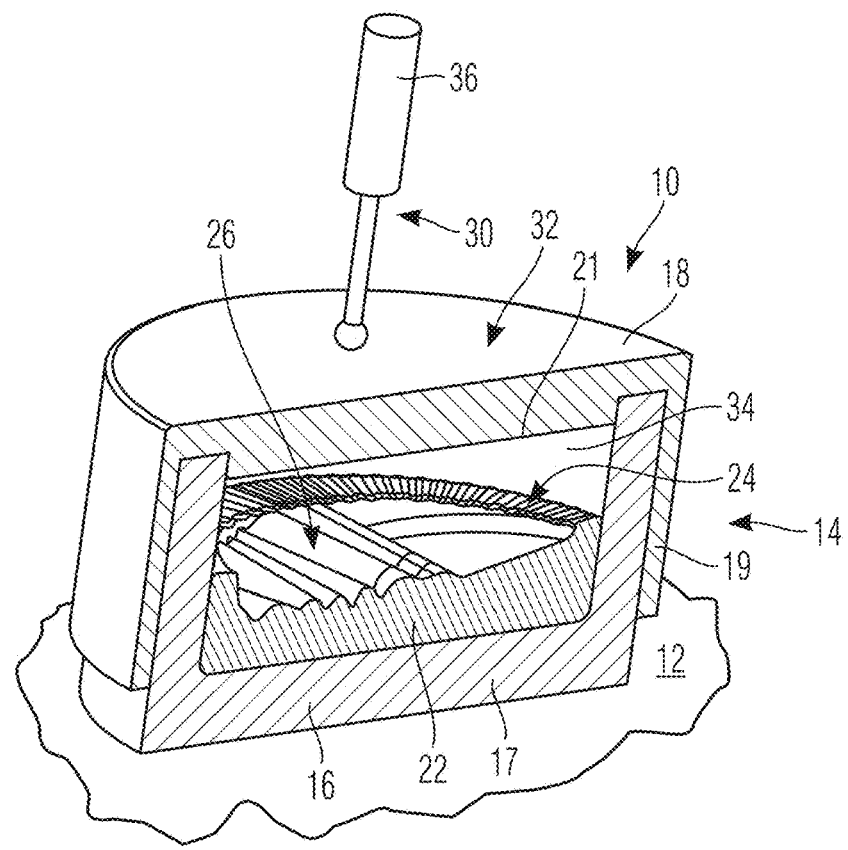
FIG. 1 is a schematized embodiment of the invention showing a mold including a cover and a touch probe according to the invention, in perspective view.

In FIG. 1, a manufacturing device 10 for manufacturing a blank of a dental restoration part such as a dental prosthesis is shown in schematic representation.

The manufacturing device 10 is intended to produce a blank as a semi-finished product from which a dental prosthesis can be milled in a subsequent manufacturing step. The blank is to be composed of two materials, namely dental material for the teeth on the one hand and base material for the prosthesis base on the other. Between these materials there is a boundary surface which is structured, i.e., forms a structure.

The manufacturing device 10 comprises a mold 14 which is placed on a support 12. The mold 14 is configured as an injection mold and is accordingly suitable for receiving injection moldable material.

The mold 14 consists of a base 16 and a cover 18, the base 16 being pot-shaped and accordingly substantially U-shaped and intended to be closed at the top by the cover 18. Its base or bottom side 17 has a fixed predetermined height. A mold cavity 34 is formed in the mold 14, which can be filled by injection molding material.

In the embodiment according to FIG. 1, the cover forms a skirt 19 that overlaps the base 16. This improves the reciprocal guidance of the base and the cover. Furthermore, a short sealing projection 21 extends into the base. The mold cavity 34 is sealed there.

Instead of this basic design of the mold 14, it is also possible to omit the skirt 19 (FIG. 3) or, for example, to provide a symmetrical division of the mold 14 into 2 mold halves, as is often realized with injection molds.

In the state shown in FIG. 1, the mold cavity 34 is filled with tooth material 22. The dental material 22 is a white or whitish dental material from which teeth are milled in the later manufacturing step of a dental prosthesis.

The surface of the dental material 22 facing the cover 18 has a complementary structure 24. The complementary structure 24 may be flat, but in the illustrated exemplary embodiment it is three-dimensionally shaped, i.e., uneven. At the same time, it forms a boundary surface 26 with a base material that has not yet been inserted. The blank thus consists of tooth material 22 on the one hand and base material on the other.

Figure 3:
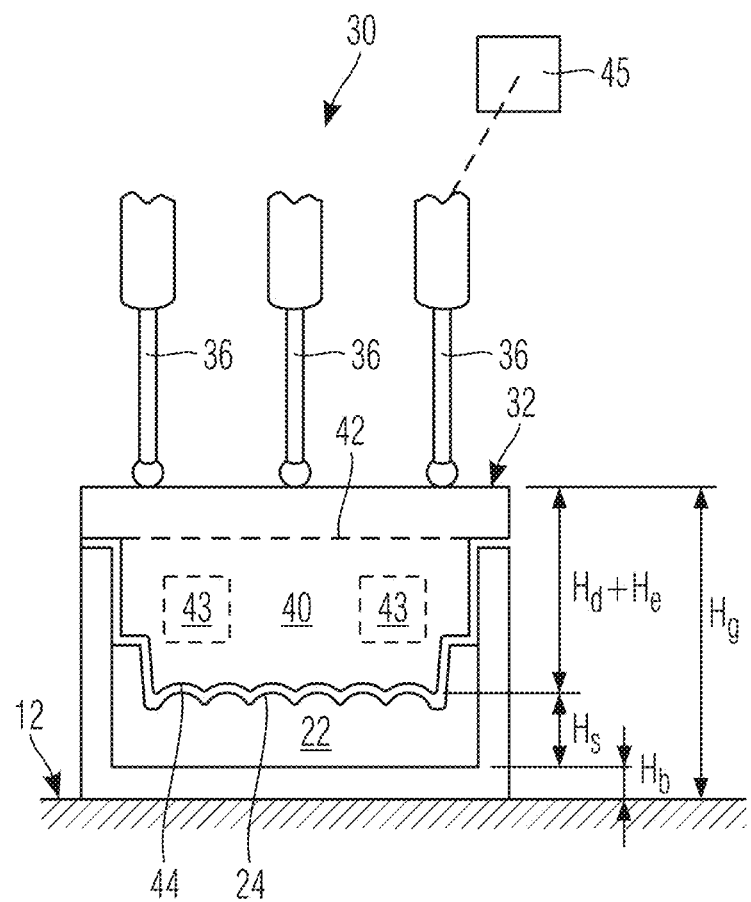
FIG. 3 is a sectional view of a further embodiment of the invention, also in schematized form.

The production of the blank in the manufacturing device 10 proceeds in the following steps:

An insert body 40, as shown for example in FIG. 3, is inserted into the mold cavity 34. The insert body has a structure 44 towards the bottom which is complementary to the complementary structure 24 as shown in FIG. 1. An injection molding space is formed between this complementary structure 24 and the base 16.

This injection molding space is now filled with tooth material 22. A heater is incorporated in the insert body or in the cover 18. The heating is switched on and the tooth material 22 is partially polymerized, i.e., pre-polymerized.

This state is shown in FIG. 3, and in this state a height measuring device 30 takes the measurement described further below. For this purpose, the upper side of the cover 18 is formed as a reference surface 32, the height of which is measured relative to the support 12.

The insert body 40 is then removed. The cover 18 is put back on. An injection molding space 34 is formed between the cover 18 and the complementary structure 24. This state is shown in FIG. 1. Base material is now filled into the injection molding space 34. The mold 14, which is now filled with base material—and tooth material—is then heated with another heater or the same heater and the material is polymerized. Since the tooth material 22 was only pre-polymerized, it is now polymerized to completion, so that a particularly good bond between the materials results at the boundary surface 26.

Although the manufacture of the blank 46 is described herein with reference to an injection molding process, it will be understood that any other manufacturing process is possible. For example, a pure casting process may be used. In this case, the cover 18 is then applied only subsequently to the casting step in question.

The boundary surface 26 forming the complementary structure 24 may have any suitable shape. Preferred is a shape adapted to the human gingival margin, i.e. the shape of a chain line extending from distal to medial and back to the other distal side.

The determination of the height position is particularly important for this boundary surface, because it should correspond to the height position of the human gingival margin.

However, the method of determining the height position according to the invention is not only applicable to the boundary surface between the dental material and the base material, but also, for example, to the layers of the so-called multi-materials. This is understood to mean a dental material or also a base material that is multi-layered, whereby in the case of the dental material there are typically gingival darker layers and incisal lighter layers. Such layer boundary surfaces are also often not flat, but curved, for example, and are created in multi-cavity molds in a similar way as described here. Boundary surfaces and their height position in these multi-materials can be determined analogously to the method presented here.

Figure 2:
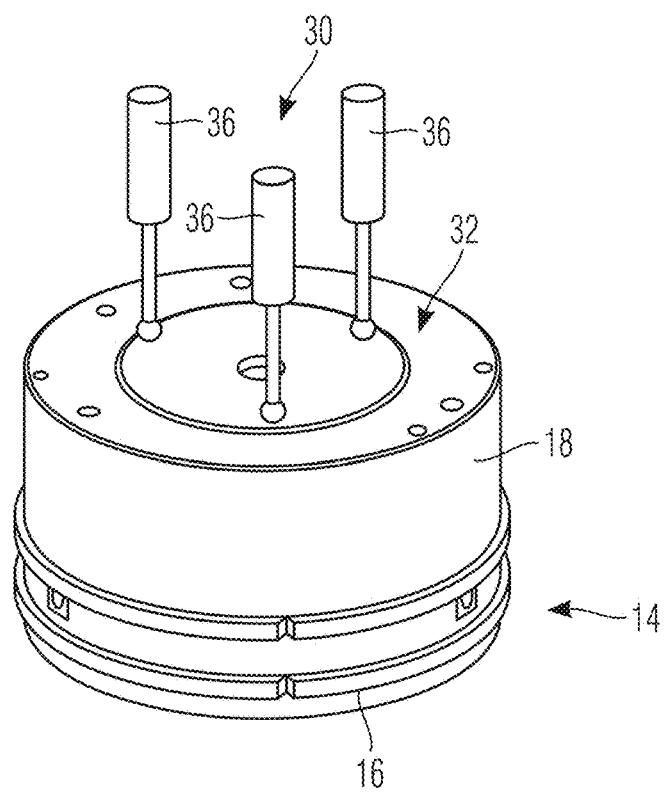
FIG. 2 is a schematized embodiment of the invention showing a mold including a cover and the touch probes according to the invention, in perspective view.

In the embodiment according to FIG. 1, the height measuring device 30 has one touch probe 36. In contrast, in the embodiment according to FIG. 2 there are 3 touch probes 36 distributed over the reference surface 32. With this design, not only the height position but also the position in space can be determined. This applies to the reference surface 32, but also to the boundary surface 26 in view of the physical connection via the insert body 40 and the cover 18.

FIG. 3 shows a further embodiment of the invention. This is shown in the condition in which measurements are taken, in which the insert body 40 with its structure 44 is in contact with the complementary structure 24 of the tooth material 22 formed by the structure 44. A heating device 43 is arranged in the cover 18 or in the insert body 40 and serves to pre-polymerize the tooth material 22.

According to the invention, the height position $H_s$ of the boundary surface 26 in the later blank 46 is to be determined. In the embodiment according to FIGS. 1 to 3, a disc-shaped, flat cylindrical blank is produced. The reference for the height position is here the underside of the blank, which here corresponds to the underside of the tooth material 22. The height position $H_s$ results from the following formula:

$$H_s = H_g - H_d - H_e - H_b$$

Where:
$H_s$: height position of the structure in the—later—blank.
$H_g$: measured total height of mold
$H_d$: known height of cover
$H_e$: known height of insert body
$H_b$: known height of base bottom According to the invention, the fact that the metallic mold 14 has known dimensions is utilized here. These include the heights $H_B$, $H_D$ and $H_e$. If the total height $H_g$ is now measured from the distance of the reference surface 32 from the support 12, it is then easy to determine the remaining variable $H_s$ from this.

The insert body 40 may be either integral with the cover 18, as shown in FIG. 3 or separate therefrom, as shown by dotted line 42. In the one-piece embodiment, the combination of the cover 18 and the insert body 40 is replaced by a flat cover 18 for the second step in the manufacture of the blank. In the two-piece embodiment, the mold 14 is opened and the insert body 40 is removed and the cover 18 is replaced for the second step to form the mold cavity 34.

The insert body 40 has a structure 44 on its underside. In the one-piece embodiment, the structure 44 is provided on the underside of the first cover 18. The second cover is preferably flat, possibly with a protrusion 21, as can be seen in FIG. 1.

The support 12 may be either a solid and/or flat support, for example metallic, on which the mold 14 can be moved. The support can also be a path of movement or a conveyor path on which the mold 14 can be placed or stands, and on which or with which the mold 14 can be moved.

FIG. 3 also shows a control device 45 which is connected to the height measuring device 30. The control device 45 performs the calculation according to the above formula and the related data associated with the manufactured blank are stored.

Figure 4:
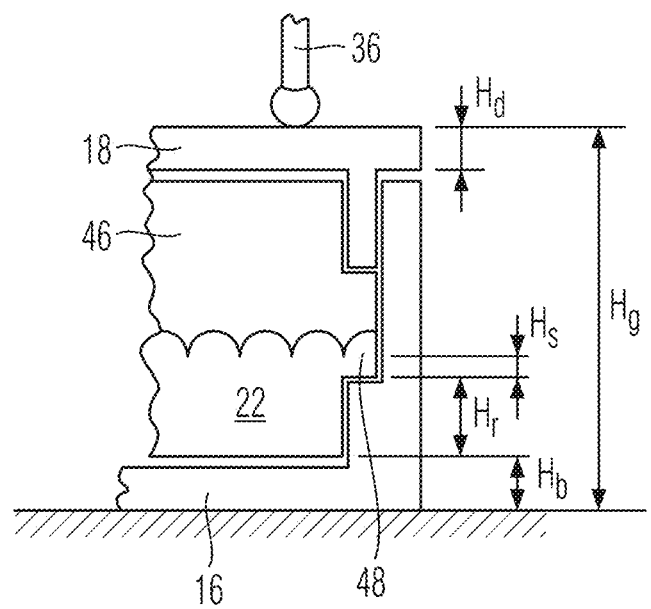
FIG. 4 is a sectional view of a further embodiment of the invention, also in schematized form.

FIG. 4 shows a further embodiment according to the invention. In this embodiment, a blank 46 is not purely in the shape of a flat cylinder, but has a circumferential edge flange 48. At this edge flange 48, the blank 46 is clamped in the holder not shown here of a milling machine. Accordingly, one surface of the edge flange 48 serves as a height reference. In the illustrated exemplary embodiment, the lower radial surface of the edge flange 48, which lies in the tooth material 22, is used for this purpose.

The reference is therefore different and does not refer to the lower surface of the disc of the blank 46, but to the height position of the edge flange $H_f$.

However, this value is likewise fixed, because it is present towards the metallic body of the base 16. The height position $H_s$ is then determined with the following formula:

$$H_s = H_g - H_d - H_e - H_f$$

Here:
$H_s$: height position of the structure in the—later—blank
$H_g$: measured total height of mold
$H_d$: known height of cover $H_e$: known height of insert body $H_f$: known height of radial surface of edge flange In this embodiment, the cover 18 is similar to a punch in that it is responsible for shaping the upper region of the edge flange 48. In this respect, it can also be regarded as hood-shaped.

Figure 5:
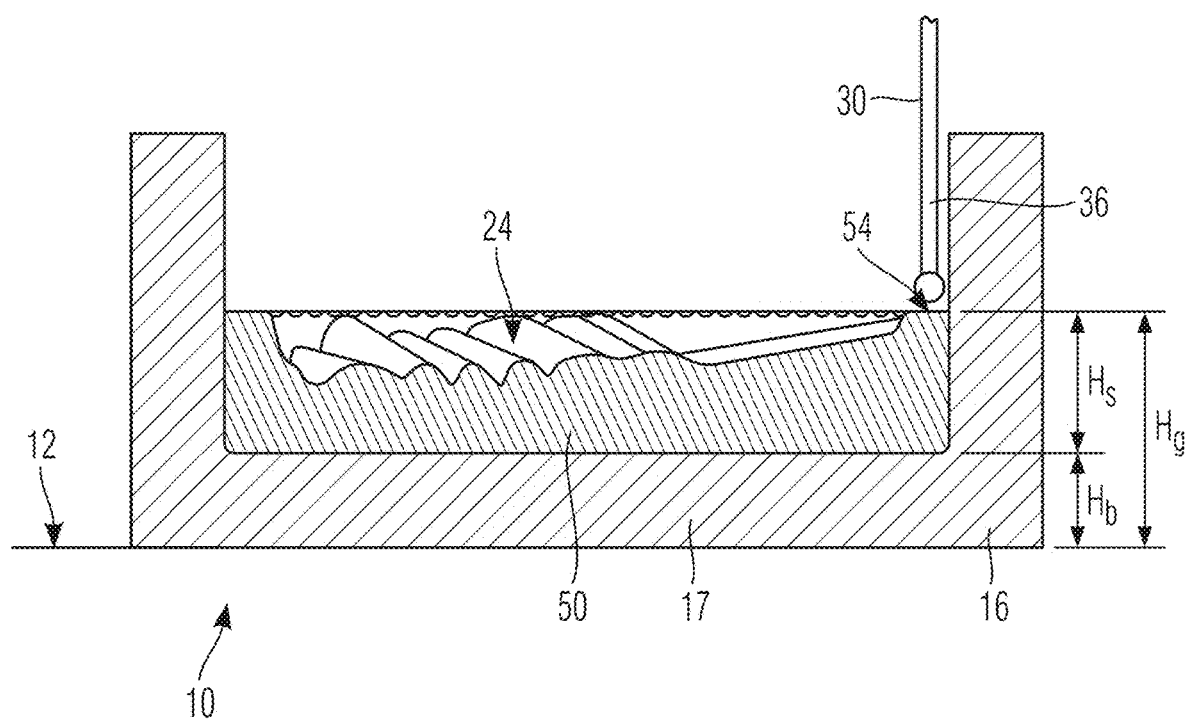
FIG. 5 is a sectional view of a pre-made first part, after insertion into the mold.

FIG. 5 shows a further embodiment of a manufacturing device 10 according to the invention in parts.

Only the base 16 is shown and the cover 18 is omitted. A first part 50 of a milling blank to be manufactured is inserted into the base 16. This part already has the complementary structure 24 on its upper side.

The part 50 fits snugly into the base 16. It may be prefabricated in any suitable manner. For example, it may have been manufactured by an additive process such as 3D printing. It can also be made in a special injection mold or one corresponding to the mold 14 presented here. It would also be possible to manufacture the part 50 subtractively, for example by milling.

The part 50 comprises a material reference surface 54 on its upper side, for example at the edge. Its position is measured by means of a sensor 36 of the height measuring device 30. The same height measuring device 30 as in the other embodiments may be used, or a different one.

The output signal of the height measuring device 30 is fed to the control device and evaluated as previously described. When the height position of the material reference surface 54 is within a tolerance range of, for example, 0.5 mm, the milling blank is completed by placing the second cover 18 with the flat underside on the base 16 as shown in FIG. 1, thereby closing the mold 14.

Base material is injected to form a second part of the blank and polymerization is carried out. This produces a blank from the prefabricated first part 50 of tooth material and the injected base material, the boundary surface of which is at a height which is within the predetermined tolerance.

The calculation of the height $H_s$ of the first part 50 is carried out analogously to the previously described, by the subtraction $H_g - H_b$. Here, too, the base 17 has a predetermined height. The actual measurement takes place between the support 12 and the material reference surface 54.

Figure 6:
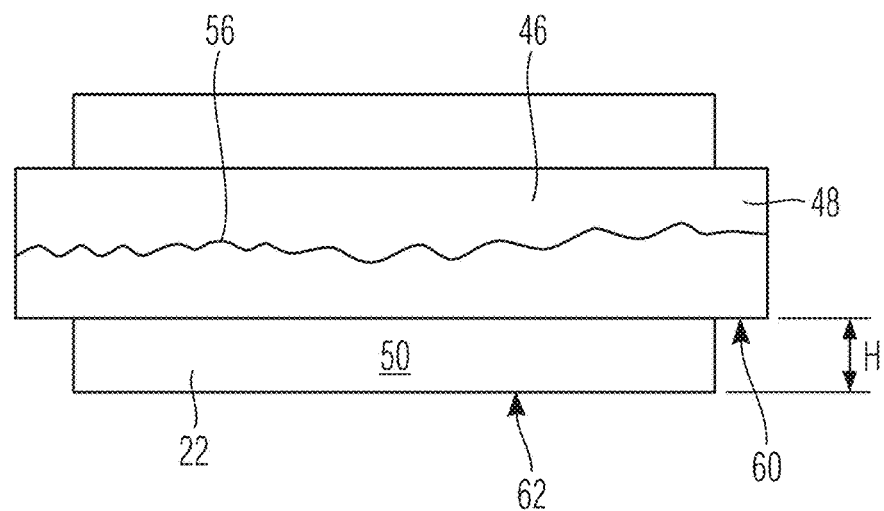
FIG. 6 is a schematic view of a blank produced according to the invention.

FIG. 6 schematically shows a blank 46. The blank 46 is manufactured according to the invention and has a circumferential edge flange 48. A boundary surface 56 between the tooth material 22 and the base material extends within the height of the edge flange 48.

The gingival margin is later formed at this point in the finished prosthesis. Its height position is determined to an accuracy of about 0.5 mm.

For the fabrication of the prosthesis, the blank 46 is clamped in a clamping device of a dental milling machine. Here it is necessary to determine the relative position of the blank to the clamping device much more precisely. For this purpose, the lower surface 60 of the edge flange 48 forms a reference surface, the height H of which relative to the lower surface 62 of the milling blank is precisely determined, for example with a tolerance of 0.02 mm.

It is readily possible to maintain such a small tolerance by using a steel mold for the base 16, as this is also used for the embodiments of the edge flange 48. When the surface 60 is used as a reference surface, it is not necessary to use the height measuring device 30 according to the invention for determining the height position thereof.

If, on the other hand, the opposite surface, i.e. the surface consisting of the base material, is to be used, its height must be determined by using the height measuring device 30 as described above.

In some embodiments, the innovations may be implemented in additive manufacturing devices having diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

The invention claimed is:

1. A manufacturing device for manufacturing a blank for a dental restoration part, comprising
a mold for receiving blank material, said mold having a base and a punch or cover with an underside, and
a control device for the manufacturing device,
wherein a height measuring device is connected to the control device, which measures a height of a reference surface connected to the punch or cover, relative to the base or a support on which the base stands,
wherein the control device calculates a height position of the underside of the punch or cover based on the measured height,
wherein a structure is formed on the underside of the cover or provided as an insert body and a height position of the structure calculated by the control device comprises a calculation of at least one reference point of the structure, which wherein the structure is stationary,
wherein the structure is wave-shaped,
wherein tooth material and base material are used as blank materials and the structure corresponds to a boundary surface between the tooth material and the base material in a semi-finished product to be manufactured, and forms a chain line along a gingival margin in the semi-finished product,
wherein the control device outputs data on the height position of the structure, and
wherein the output data is transferred to a CAM device, wherein with the output data the semi-finished product is positioned in the CAM device to correctly align the gingival margin of the semi-finished product with a gingival margin of the dental restoration part to be milled.

2. The manufacturing device according to claim 1, wherein the reference surface is formed on a top of the punch or cover and the height measuring device measures a distance between an upper side of the punch or cover and the base or the support on which the base is placed.

3. The manufacturing device according to claim 1, wherein the height measuring device comprises at least one optical sensor or at least one touch probe.

4. The manufacturing device according to claim 1, wherein an output device is connected to the control device and outputs the height position of the structure in relation to the base as data for an assignment to a respective molded blank for the dental restoration part, or to a printer for generating labels which can be used to print labels for attachment to the blank, or to an RFID chip programming device, or wherein the control device stores the data in a memory in a database, wherein the memory can be accessed by the CAM device for milling the dental restoration part.

5. The manufacturing device according to claim 1, wherein the structure extends three-dimensionally in space and spans a structural plane which has an inclination to the base of up to 30% and less than 15%, and whose height or spatial position relative to a support comprising a conveyor path, on which the mold can be placed or stands, is calculated by the control device using measurement results of the height measuring device.

6. The manufacturing device according to claim 1, wherein the structure corresponds to the boundary surface between differently colored layers of tooth material and/or of base material in the blank.

7. The manufacturing device according to claim 1, wherein, for the calculation of the height position of the structure, the control device subtracts a known distance between a bottom of the insert body or the underside of the cover and a top of the cover from the height measured by the height measuring device and a distance between a lower inside of the mold and a bottom of the mold in order to determine the height position of the structure.

8. The manufacturing device according to claim 1, wherein the control device takes into account a material-dependent or material-conditional shrinkage factor for shrinkage between partial polymerization and full polymerization in the output data.

9. The manufacturing device according to claim 1, wherein the mold omits a circumferential edge which results in a projecting circumferential edge on the blank, the height position of the structure which is taken into account as a first calculated reference when milling the blank, the edge being adjacent to the structure, in terms of height,
wherein the base of the mold has or forms a lower reference surface, the height position of the structure of which is taken into account as a second calculated reference when milling the blank.

10. The manufacturing device according to claim 1, wherein the output data on the height position of the structure calculated by the control device also comprises data characterizing the boundary surface between the tooth material and the base material.

11. The manufacturing device according to claim 1, wherein the punch or cover comprises the structure as an insert body, and
wherein the measurement of the height position of the structure relates to the measurement of an underside of the insert body.

12. The manufacturing device according to claim 3, wherein the at least one touch probe comprises a plurality of touch probes.

13. The manufacturing device according to claim 1, wherein the at least one reference point of the structure comprises at least 3 reference points of the structure.

* * * * *